(12) United States Patent
Elisha

(10) Patent No.: US 11,430,335 B2
(45) Date of Patent: Aug. 30, 2022

(54) METHOD AND APPARATUS FOR PROVIDING LARGE SCALE VEHICLE ROUTING

(71) Applicant: HERE GLOBAL B.V., Eindhoven (NL)

(72) Inventor: Oren Elisha, Raanana (IL)

(73) Assignee: HERE Global B.V., Eindhoven (NL)

( * ) Notice: Subject to any disclaimer, the term of this patent is extended or adjusted under 35 U.S.C. 154(b) by 96 days.

(21) Appl. No.: 16/779,141

(22) Filed: Jan. 31, 2020

(65) Prior Publication Data

US 2021/0241625 A1    Aug. 5, 2021

(51) Int. Cl.
| | |
|---|---|
| G08G 1/00 | (2006.01) |
| G06K 9/62 | (2022.01) |
| G01C 21/34 | (2006.01) |
| G08G 1/01 | (2006.01) |

(52) U.S. Cl.
CPC ........... *G08G 1/202* (2013.01); *G01C 21/343* (2013.01); *G01C 21/3446* (2013.01); *G06K 9/6219* (2013.01); *G08G 1/0145* (2013.01)

(58) Field of Classification Search
CPC ... G08G 1/202; G01C 21/343; G01C 21/3446
See application file for complete search history.

(56) References Cited

U.S. PATENT DOCUMENTS

| | | | |
|---|---|---|---|
| 2010/0027686 A1* | 2/2010 | Zuo ...................... | H04N 19/187 382/233 |
| 2013/0159206 A1 | 6/2013 | Barahona et al. | |
| 2015/0206285 A1* | 7/2015 | Pajak ....................... | G06T 5/002 382/265 |
| 2016/0300186 A1* | 10/2016 | Scharaswak ....... | G06Q 10/0835 |

(Continued)

FOREIGN PATENT DOCUMENTS

| | | | |
|---|---|---|---|
| CN | 108596390 A | 9/2018 | |
| KR | 20180075613 A * | 7/2018 | ......... G01C 21/3446 |

OTHER PUBLICATIONS

Dondo et al., "A Cluster-based Optimization Approach for the Multi-depot Heterogeneous Fleet Vehicle Routing Problem with Time Windows", published in Elesevier 176 (2007) 1478-1507, ScienceDirect,retrieved on Jan. 31, 2020, from "http://cepac.cheme.cmu.edu/pasi2011/library/cerda/ejor-176(3)-2007.pdf", 30 pages.

(Continued)

*Primary Examiner* — Khoi H Tran
*Assistant Examiner* — Tristan J Greiner
(74) *Attorney, Agent, or Firm* — Ditthavong, Steiner & Mlotkowski

(57) ABSTRACT

An approach is provided for large scale vehicle routing. The approach involves, for example, receiving a plurality of plans, wherein a plan of the plurality of plans assigns a vehicle, a driver of the vehicle, or a combination thereof a set of rides to traverse. The approach also involves clustering the plurality of plans into one or more clusters based on a proximity measure. The proximity measure indicates a proximity of a first plan of the plurality of plans to a second plan of a plurality of plans. The approach further involves, for each cluster of the one or more clusters, separately computing a solution to a multiple vehicle routing problem for the set of rides in said each cluster.

20 Claims, 11 Drawing Sheets

(56) References Cited

U.S. PATENT DOCUMENTS

| | | |
|---|---|---|
| 2018/0060988 A1 | 3/2018 | Klenk et al. |
| 2019/0020973 A1* | 1/2019 | Harish .................. G06F 3/14 |
| 2019/0120640 A1* | 4/2019 | Ho .................. G01C 21/3492 |
| 2020/0292346 A1* | 9/2020 | Turner ................ G06Q 10/047 |

OTHER PUBLICATIONS

Comert et al."A New Approach for Solution of Vehicle Routing Problem with Hard Time Window: an Application in a Supermarket Chain", published in Sadhana vol. 42, No. 12, Dec. 2017, retrieved on Jan. 31, 2020, from "https://www.ias.ac.in/article/fulltext/sadh/042/12/2067-2080", pp. 2067-2080, 14 pages.

Nallusamy et la., "Optimization of Multiple Vehicle Routing Problems Using Approximation Algorithms", retrieved on Jan. 31, 2020, from "https://www.researchgate.net/publication/45897065_Optimization_of_Multiple_Vehicle_Routing_Problems_Using_Approximation_Algorithms", published in /International Journal of Engineering Science and Technology vol. 1(3), 2009, 129-135, 7 pages.

Prins et al., "Order-first Split-second Methods for Vehicle Routing Problems: A Review", retrieved on Jan. 31, 2020, from "https://www.researchgate.net/publication/260231970_Order-first_split-second_methods_for_vehicle_routing_problems_A_review", published in Elsevier Part C 40 (2014), pp. 179-200, 22 pages.

\* cited by examiner

| Plan ID | Vehicle /Driver ID | Ride ID | Pick-up Node ID | Pick-up time | Pick-up Object & Quantity | Drop-off Node ID | Drop-off Time | Drop-off Object & Quantity | Cost estimate | Service criteria |
|---|---|---|---|---|---|---|---|---|---|---|
| 1 | 123 | 001 | 599085 | 6:30 am | 96 package | 928046 | 6:50 am | 5 packages | $75 | |
| 1 | 123 | 002 | 928046 | 6:55 am | 3 packages | 818580 | 7:30 am | 2 packages | $100 | |
| 1 | 123 | 003 | 818580 | 7:35 am | 0 | 306046 | 8:00 am | 4 package | $60 | |
| ... | | | | | | | | | | |
| 2 | 71 | 62 | 098899 | 8:00 am | 1 passenger | 018358 | 8:10 am | 1 passenger | $25 | Wheelchair accessible |
| 2 | 71 | 63 | 018358 | 8:15 am | 2 passengers | 070000 | 8:35 am | 1 passenger | $15 | |
| 2 | 71 | 64 | 070000 | 9:10 am | 1 passenger | 091754 | 10:10 am | 1 passenger | $15 | |
| ... | | | | | | | | | | |
| 3 | 251 | 103 | 599085 | 2:00 pm | 9 passengers | 660032 | 2:30 pm | 2 passengers | $100 | |

METHOD AND APPARATUS FOR PROVIDING LARGE SCALE VEHICLE ROUTING

BACKGROUND

Navigation systems and services have enjoyed widespread acceptance and use by consumers, but service providers and developers of such systems continue to face significant technical challenges to solve large scale routing and fleet optimization problems. For example, traditional vehicle ride planning systems, such as pre-booked taxi rides, vehicle based delivery rides, shuttle rides, etc., using heuristics (e.g., Held-Karp Algorithm) to solve a large scale vehicle routing problem. However, none of these algorithms is capable of consistently solving instances in finite time for a large problem size. One solution is to split the rides metadata by time of day, ride geographical position, etc. into several smaller solvable problems. Nevertheless, the approach of splitting the rides metadata might not converge to a global optimal routing solution for the large scale vehicle routing problem.

SOME EXAMPLE EMBODIMENTS

Therefore, there is a need for an approach for providing large scale vehicle routing, for instance, via an algorithm to split a large scale vehicle routing problem to sub-problems with minimal impact on a global optimal routing solution.

According to one embodiment, a computer-implemented method comprises receiving a plurality of plans, wherein a plan of the plurality of plans assigns a vehicle, a driver of the vehicle, or a combination thereof a set of rides to traverse. The method also comprises clustering the plurality of plans into one or more clusters based on a proximity measure. The proximity measure indicates a proximity of a first plan of the plurality of plans to a second plan of a plurality of plans. The method further comprises separately computing, for each cluster of the one or more clusters, a solution to a multiple vehicle routing problem for the set of rides in said each cluster.

According to another embodiment, an apparatus comprises a processor, and a memory including computer program code, the memory and the computer program code configured to, with the processor, cause, at least in part, the apparatus to receive a plurality of plans, wherein a plan of the plurality of plans assigns a vehicle, a driver of the vehicle, or a combination thereof a set of rides to traverse. The apparatus is also caused to cluster the plurality of plans into one or more clusters based on a proximity measure. The proximity measure indicates a proximity of a first plan of the plurality of plans to a second plan of a plurality of plans. The apparatus is further caused to separately compute, for each cluster of the one or more clusters, a solution to a multiple vehicle routing problem for the set of rides in said each cluster.

According to another embodiment, a computer-readable storage medium carries one or more sequences of one or more instructions which, when executed by one or more processors, cause, at least in part, an apparatus to receive a plurality of plans, wherein a plan of the plurality of plans assigns a vehicle, a driver of the vehicle, or a combination thereof a set of rides to traverse. The apparatus is also caused to cluster the plurality of plans into one or more clusters based on a proximity measure. The proximity measure indicates a proximity of a first plan of the plurality of plans to a second plan of a plurality of plans. The apparatus is further caused to separately compute, for each cluster of the one or more clusters, a solution to a multiple vehicle routing problem for the set of rides in said each cluster According to another embodiment, an apparatus comprises means for receiving a plurality of plans, wherein a plan of the plurality of plans assigns a vehicle, a driver of the vehicle, or a combination thereof a set of rides to traverse. The apparatus also comprises means for clustering the plurality of plans into one or more clusters based on a proximity measure. The proximity measure indicates a proximity of a first plan of the plurality of plans to a second plan of a plurality of plans. The apparatus further comprises means for separately computing, for each cluster of the one or more clusters, a solution to a multiple vehicle routing problem for the set of rides in said each cluster.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention. In one embodiment, the apparatus is further caused to present the justification message based on receiving user request following a presentation of the recommended route.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6B is a diagram of a user interface used in the processes for providing large scale vehicle routing, according to one embodiment;

DESCRIPTION OF SOME EMBODIMENTS

Examples of a method, apparatus, and computer program for providing large scale vehicle routing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
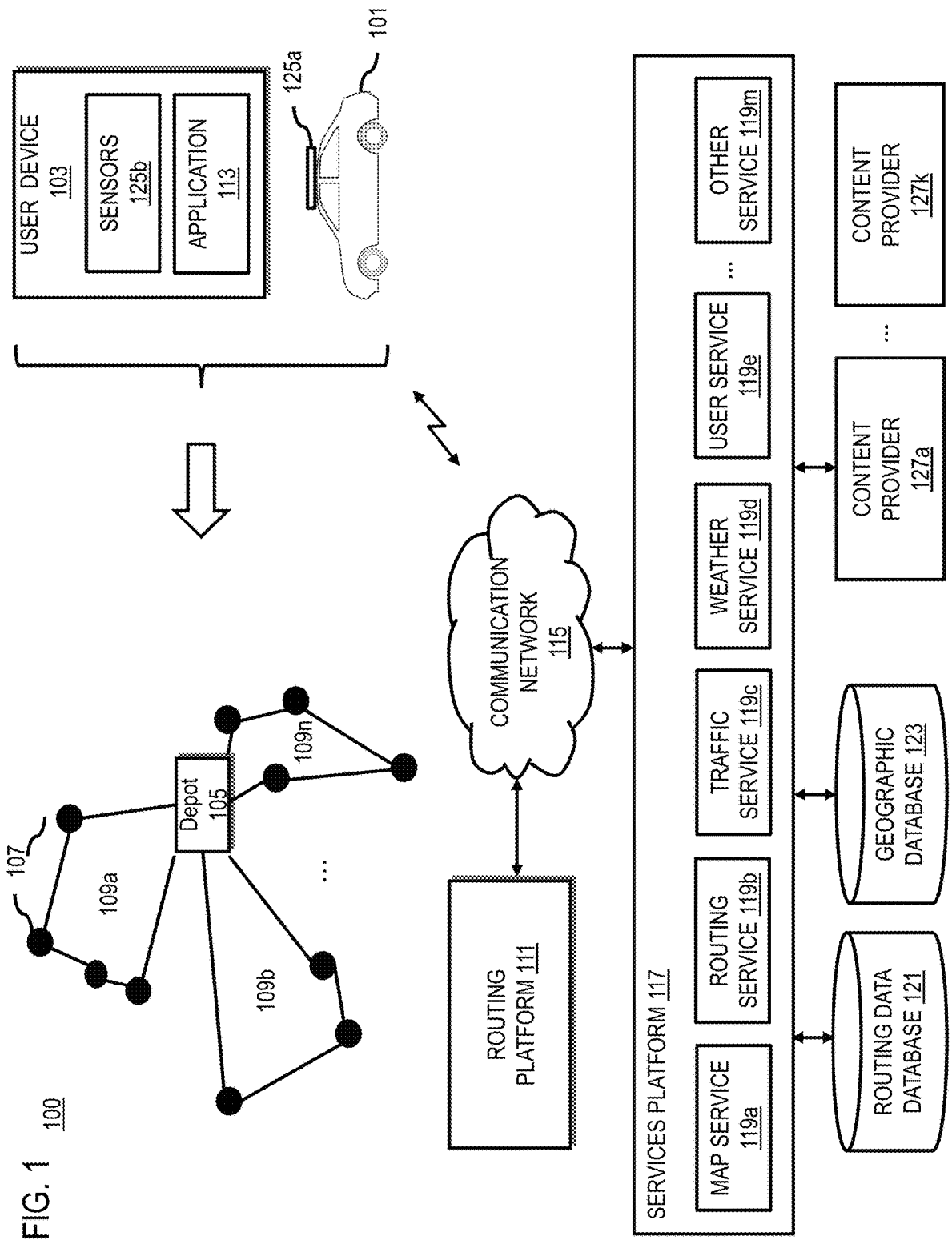
FIG. 1 is a diagram of a system capable of providing large scale vehicle routing, according to one embodiment.

FIG. 1 is a diagram of a system capable of providing large scale vehicle routing, according to one embodiment. A vehicle routing problem (VRP), or more precisely multiple vehicle routing problem (mVRP), is a combinatorial optimization and integer programming problem to determine the optimal set of routes for a fleet of vehicles to traverse in order to deliver customers/packages to a given set of destinations. By way of example, one or more vehicles (e.g., a vehicle 101) dispatched from one or more depots (e.g., a depot 105) to transport users of navigation services (e.g., a user of a user device 103 such as a smartphone, personal navigation device, etc.) via routes 109a-109n between pick-up points and drop-off points 107, such that all users' requirements and operational constraints are satisfied and the global transportation cost function (e.g., function based on minimizing travel distance, travel time, use of certain road types, etc.) is minimized. In this example, one route for each vehicle that starts and finishes at a respective depot. Such routing and fleet optimization problem is a NP-Hard problem. The computational complexity, e.g., the respective solution runtime and memory consumption, increases exponentially with a problem size. In other words, the more rides to optimize, the problem becomes exponentially harder to solve. As a result, only relatively small problem instances can be solved to optimality by the exact solution methods modelling the VRP, such as vehicle flow formulations. The existing algorithms are capable of consistently solving problem instances no more than a few dozens of pick-up/drop-off points. Partial enumeration based exact algorithms (e.g., branch-and-bound, dynamic programming, etc.) have a slow convergence rate. Since the exact solution methods are generally inadequate, heuristics are commonly used in practice.

The most direct heuristic (partial search technique or algorithm) is Brute Force Search which has a running time of $O(n!)$, where n is the number of nodes under consideration. Another heuristic: Held-Karp algorithm (i.e., an application of dynamic programming) can solve a vehicle routing problem in a running time of $O(n^2 2^n)$. Similarly, the other heuristics, such as branch-and-bound algorithms, linear programming algorithms, etc., cannot solve a large scale vehicle routing problem in finite time.

As mentioned, one possible solution is to split the ride data to create several smaller, solvable vehicle routing problems. A few simple options to split the ride data is to split the rides metadata based on time of day, ride geographical position, etc. However, splitting the ride data unwisely might prevent a solver (e.g., a routing platform 111, navigation application 113 executing on the user device 103 or vehicle 101, or any other navigation routing engine) from converging to a global minimum/maximum solution. Accordingly, navigation routing and mapping service providers face significant technical challenges to solve a large scale vehicle routing problem in finite time.

To address these technical challenges, the system 100 of FIG. 1 introduces a new algorithm to split a large scale vehicle routing problem to sub-problems with minimal impact/harm to a global vehicle routing solution. For example, the system 100 applies a clustering method to split a large scale vehicle routing problem including a set of rides to traverse into sub-problems, and then separately computes a solution to the sub-problems for the set of rides in each cluster.

In one embodiment, the system 100 runs a simple and fast heuristic solution that assigns each driver/vehicle a set of rides to traverse (hereinafter a "plan"). These plans may not be efficient or optimal. The system 100 then clusters the plans that are "proximate", e.g., a high probability that driver/vehicle i (following plan i) can take on rides from plan j. After clustering the plans into K clusters, the system 100 solves sub-problems in parallel using an optimization algorithm, such as Mixed Integer Programming (MIP), on rides data from each cluster. As a result, the system 100 solves a set of small solvable vehicle routing problems, instead of solving a large scale VRP.

The system 100 takes as input enhanced rides data (including shared rides, rides graph, sub-optimal plans, etc., to calculate a proximity measure between two plans by using a distance metric (i.e., plan projection which defines a set of proximities S considering nodes that are common to both plans). The system 100 then iteratively clusters the set of plans into smaller clusters (e.g., using k-medoids clustering) until all clusters are smaller than a maximum number of rides. The system 100 then iteratively merges the smallest clusters with other clusters based on the distance metric until all clusters are larger than a minimum number of rides or until the maximum number of rides is not exceeded. The system 100 then solves a sub-VRP for each cluster by using a Mixed Integer Programming (MIP) based optimizer.

In one embodiment, the system 100 integrates the routing platform 111 over a communication network 115 with a services platform 117 to provide large scale vehicle routing. The services platform 117 can include one or more services 119a-119m (also collectively referred as services 119) that can provide real-time and/or historical ride data for clustering plans and solving a large scale vehicle routing problem under various contexts (e.g., traffic, weather, time of day, vehicle type, activity, etc. as stored in a routing data database 121). In some embodiments, the system 100 can infer a destination and a request for a ride to the inferred destination based on historical mobility data (e.g., data on previously traveled routes, when those routes were traveled, under what conditions those routes were traveled, etc.) and/or other contextual data (e.g., calendar information, engaged activity, purpose of the trip, etc.).

In one embodiment, the system 100 implements a restriction on the loading of the vehicles, such as at one or more delivery/visit locations, an item being delivered must be the item most recently picked up. In another embodiment, the system 100 implements a load restriction, such as vehicles with limited carrying capacity of the passengers/goods that must be carried. In another embodiment, the system 100 implements a time restriction, such as the deliveries/visits must be made within one or more time windows. In another embodiment, the vehicles can do more than one route. In another embodiment, the vehicles are dispatched from multiple depots, and not required to return to the same depot. In another embodiment, the vehicles are dispatched from multiple depots, and not required to return to any of the depots.

The advantage of the various embodiments for large scale vehicle routing is to simplify the optimization problem by effectively splitting the large scale problem to a set of smaller and easier to solve sub-problems, while preserving the global solution of the large scale problem as much as possible, while meeting the demands and/or criteria of the customers, the ride service providers, the delivery service providers, etc. As results, the customers as a group will benefit from shorter travel times and/or distances to arrive at their destinations timely and more quickly, the ride/delivery service providers will save operational costs with better customer satisfaction, and the environment becomes better for less energy consumption from traveling shorter times/distances and/or less congested routes (e.g., assuming better routes mean less energy wasted by the vehicles 101 being stuck in congestion).

Figure 2:
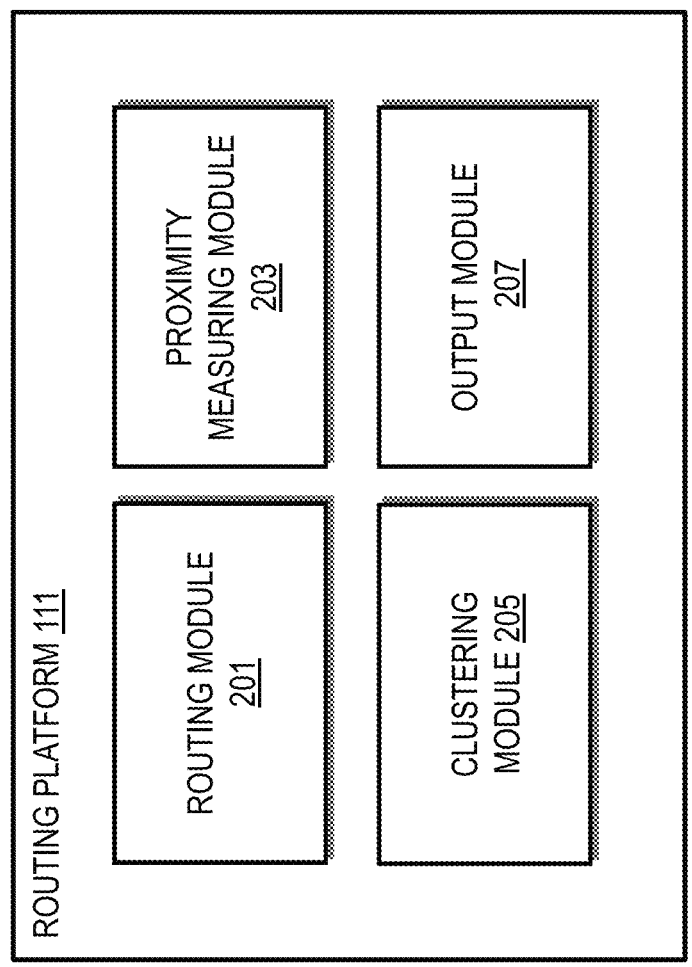
FIG. 2 is a diagram of the components of a routing platform, according to one embodiment.

FIG. 2 is a diagram of the components of a routing platform, according to one embodiment. As shown in FIG. 2, the routing platform 111 includes one or more components for providing large scale vehicle routing according to the various embodiments described herein. It is contemplated that the functions of these components may be combined or performed by other components of equivalent functionality. In this embodiment, the routing platform 111 includes a routing module 201, proximity measuring module 203, clustering module 205, and output module 207. The above presented modules and components of the routing platform 111 can be implemented in hardware, firmware, software, or a combination thereof. Though depicted as a separate entity in FIG. 1, it is contemplated that the routing platform 111 may be implemented as a module of any other component of the system 100 (e.g., a component of the services platform 117, any of the services 119, vehicle 101, user device 103, application 113 executing on the user device 103, etc.). In another embodiment, one or more of the modules 201-207 may be implemented as a cloud-based service, local service, native application, or combination thereof. The functions of the routing platform 111 and the modules 201-207 are discussed with respect to FIGS. 3-6 below.

By way of example, the services 119 can include but are not limited to a map service 119a that provides a geographic database 123 for routing, a routing service 119b for generating navigation routes using any routing engine known in the art, a traffic service 119c for providing real-time and/or historic travel data along potential routes, a weather service 119d for providing real-time and/or historic weather data along potential routes, a user service 119e for providing personalized user data and/or preferences for routing, and/or other related or available service 119m than can interface with the routing platform 111 to provide large scale vehicle routing according to the embodiments described herein.

Figure 3:
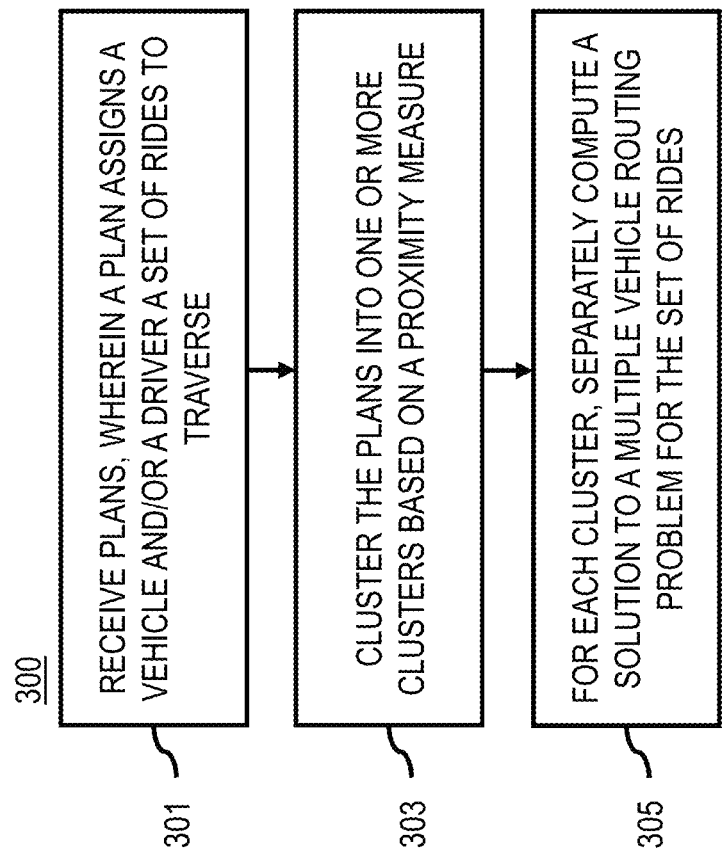
FIG. 3 is a flowchart of a process for providing large scale vehicle routing, according to one embodiment.
Figure 9:
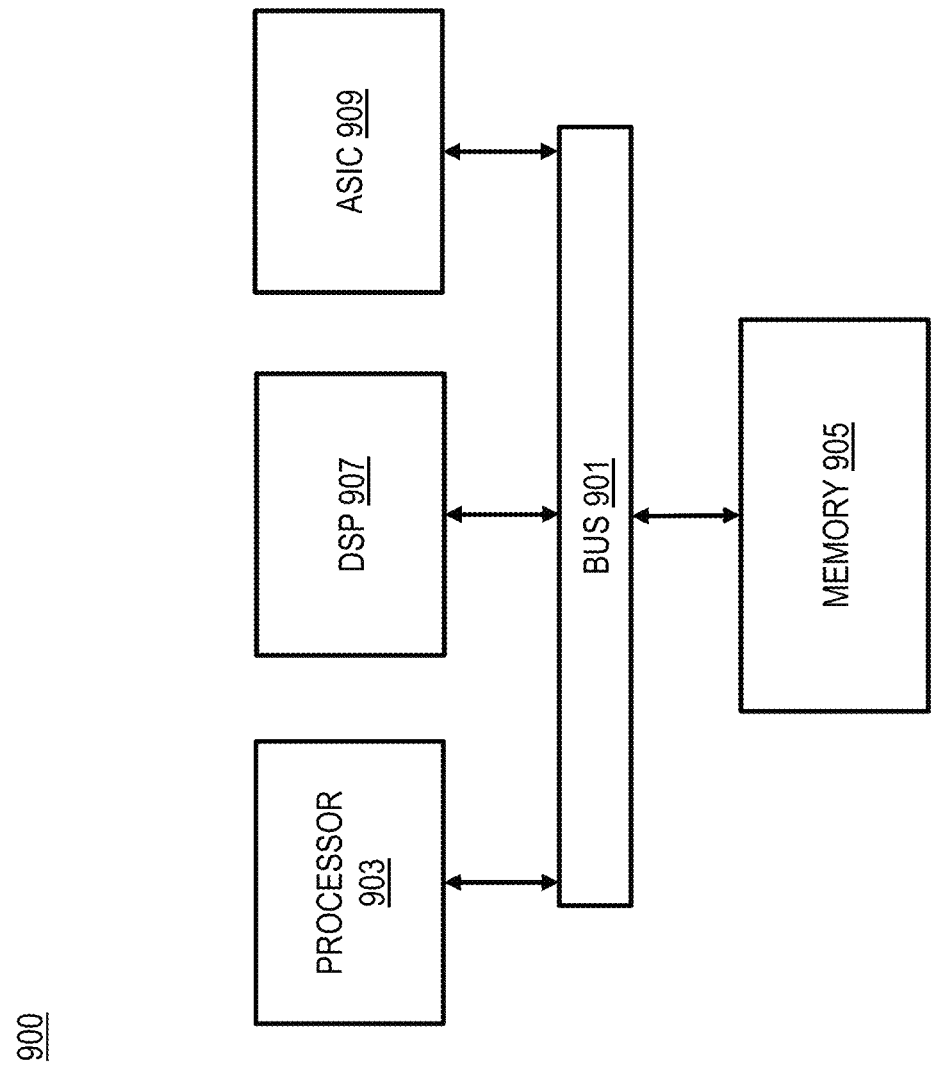
FIG. 9 is a diagram of a chip set that can be used to implement an embodiment.

FIG. 3 is a flowchart of a process for providing large scale vehicle routing, according to one embodiment. In various embodiments, the routing platform 111 and/or any of the modules 201-207 of the routing platform 111 may perform one or more portions of the process 300 and may be implemented in, for instance, a chip set including a processor and a memory as shown in FIG. 9. As such, the routing platform 111 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

Figure 4:
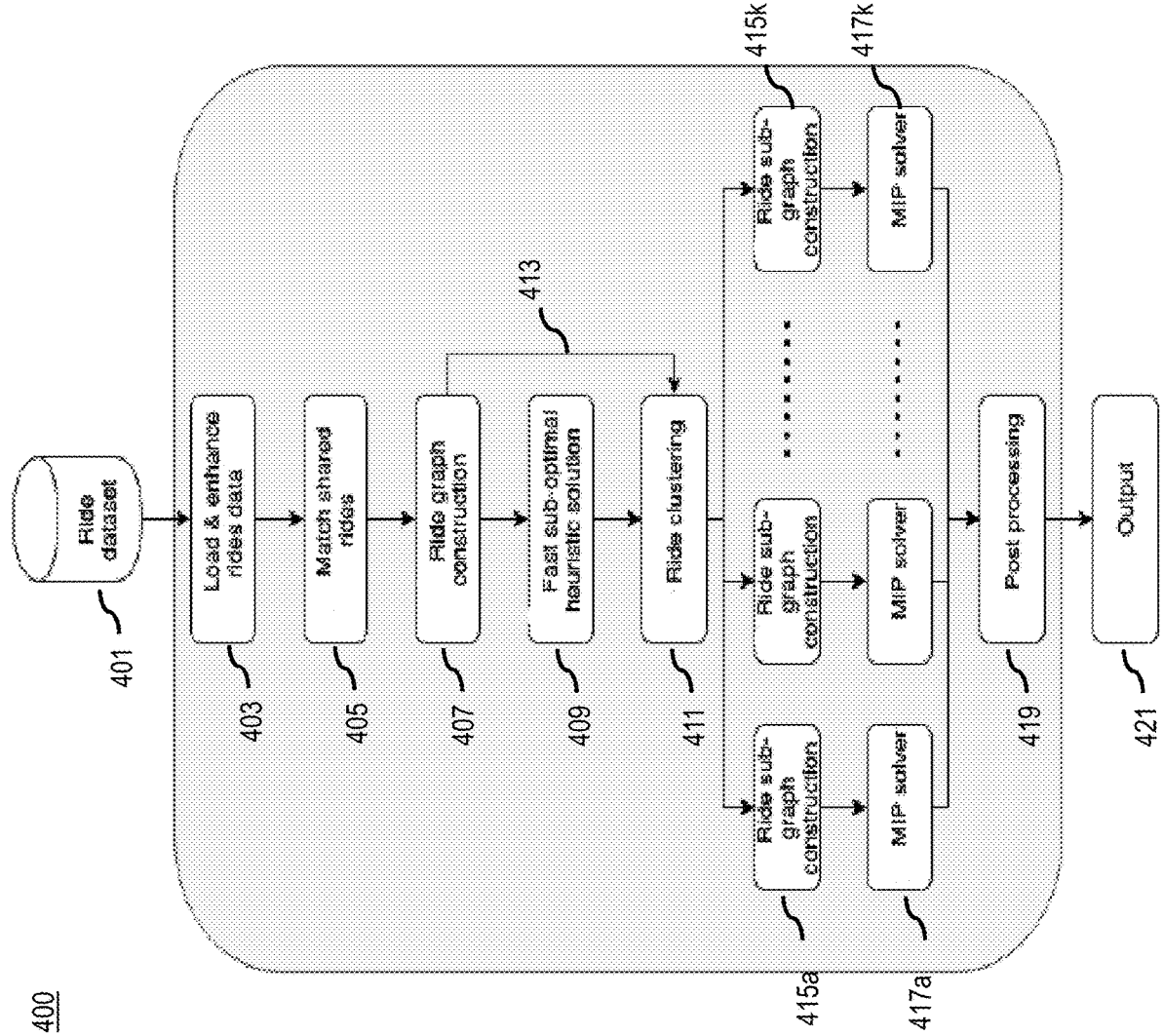
FIG. 4 is a flowchart of a process for solving a large scale vehicle routing problem, according to one embodiment.

In one embodiment, the process 300 enables the routing platform 111 to split a large scale vehicle routing problem (VRP) to a set of smaller and easier to solve sub-problems. FIG. 4 is a flowchart of a process for solving a large scale vehicle routing problem, according to one embodiment. In one embodiment, the routing module 201 loads ride data 401 to a memory (e.g., the routing data database 121). By way of example, the ride data 401 includes pick-up and drop-off location data, requested drop-off time data, data of a number of passengers/packages, special requests (e.g., wheelchair compatible, etc.), passenger/package details, etc.

In one embodiment, the VRP is defined as follows: G(V,A) is a graph with a vertex set V (rides) and an arc set A. Vertex $v_0$ represents an initial depot, all other vertices/nodes, called "intermediate nodes", correspond to customers. A is associated with some cost matrix ($c_{ij}$) and a travel time matrix ($t_{ij}$). In the classical definition, each customer has a non-negative demand $q_i$ and a service time $t_i$. a fleet of N vehicles of capacity Q is based at the depot. The number of vehicles is either known in advance or treated as a decision variable. The VRP consists of finding tours for all N vehicles, which all start at the depot, such that each intermediate node is visited exactly once and the total cost of visiting all nodes is minimized. The cost metric can be defined in terms of distance, time, number of drivers, etc. A common variant is where a time window [$a_i$, $b_i$] is imposed on the visit of each customer. The nodes to be visited (rides to complete) are structed as a graph, where the edges (arches) between nodes include an estimated driving time from drop-off ride$_i$ to pick-up ride$_j$, a distance between rides, a time lag between rides, etc.

The routing module 201 processes the ride data 401 using a routing engine to provide enhanced ride data with one or more attributes per ride in a process 403. For example, the one or more attributes include a route from a pick-up point to a destination, a pick-up time, a distance from a pick-up point to a drop-off point, an estimated time for a ride, etc.

In another embodiment, the routing module 201 processes the enhanced ride data to match shared rides under one or more criteria to provide shared ride data in a process 405. Each shared ride can be executed by the same driver/vehicle at the same time (e.g., passengers from both rides can share the driver/vehicle). For instance, the criteria include a pick-up distance, an off-route time for a ride, a lag time, etc. A new "shared ride" can be created in place of or in addition to the original rides and stored in the memory.

In one embodiment, the routing module 201 uses the routing engine to group the original rides into plans. In another embodiment, the routing module 201 uses the routing engine to group the shared rides into plans. In yet another embodiment, the routing module 201 uses the routing engine to group non-shared rides and the shared rides into plans. Each plan assigns a vehicle/driver a set of respective rides to traverse.

In yet embodiment, as in step 301, the routing module 201 directly receives a plurality of plans pre-processed by other components of the system 101, third-party sources (e.g., ride/delivery service providers, etc. A plan of the plurality of plans assigns a vehicle, a driver of the vehicle, or a combination thereof a set of rides to traverse.

Then after, the proximity measuring module 203 measures a proximity of a first plan of the plurality of plans to a second plan of a plurality of plans. By way of example, the proximity of the first plan to the second plan is based on a probability that a first driver following the first plan can take on a ride from the second plan.

In one embodiment, the proximity of the first plan to the second plan is measured based a ride graph, and each node of the ride graph corresponds to a ride of the set of rides. As mentioned, the rides may be the original rides, the shared rides, or a combination there of. By way of example, the ride graph is a directed acyclic graph (DAG) that describes all possible (feasible) connections between rides in a "prebook" VRP optimization problem. The proximity measuring module 203 constructs such ride graph to represent one or more feasible connections between the set of rides in a first plan and/or a second plan in process 407. The feasible connections are connections in which the vehicle following the first plan and/or the second plan can arrive from a drop-off location of a first ride $R_i$ drop-off to a pick-up location of a second ride $R_j$ pick-up without being late to a pick-up time of the second ride. As shows in Table 1, each node (vertex) in the ride graph represents a ride or a shared ride, while an edge (arc) in the ride graph represents a time lag, an estimated time of arrival, a distance between two rides, such as from a first ride drop-off location/time to a second ride pick-up location/time.

TABLE 1

Node (vertex) = ride / shared ride.
Edge (arc) = time lag / eta / distance between two rides The ride graph may be pruned by dropping some "expensive" connections, such as connections with high values of travel time between rides, long distance between rides, long wait time between rides, etc., in order to reduce computational complexity and load in subsequent processes.

Then after, the proximity measuring module 203 preforms a fast (potentially) sub-optimal heuristic solution to provide sub-optimal plans in process 409, prior to a clustering process 411. The proximity measuring module 203 uses heuristics to processes the enhanced ride data, the shared ride data, the ride graph, etc. to provide the sub-optimal plans that jointly include all rides. There are many known heuristics for solving VRP fast, such as Solomon's algorithm (for the vehicle routing and scheduling problems with time windows constraints), Clarke and Wright savings heuristic, the sweep algorithm (Gillett and Miller), the Fisher and Jaikumar algorithm, etc. without guarantee of an optimal global solution. In another embodiment, as shown in FIG. 4, process 409 is skipped, and the proximity measuring module 203 takes a short cut 413 to proceed to a clustering process 411.

In step 303, the clustering module 205 clusters the plurality of plans and/or sub-optimal plans into one or more clusters based on a proximity measure taken by the proximity measuring module 203. In one embodiment, the clustering module 205 processes the enhanced ride data, the shared ride data, the ride graph, the sub-optimal plans, etc., using an iterative clustering algorithm to assigns each ride to a cluster, thereby splitting one large VRP into several small VRPs in the process 411. This process will be discussed with respect to FIG. 5 below.

In step 305, the routing module 201, for each cluster of the one or more clusters, separately computes a solution to a multiple vehicle routing problem for the set of rides in said each cluster. In one embodiment, the routing module 201 processes a subset of the enhanced ride data and/or the shared ride data corresponding to a subset of rides in a cluster to provide a ride sub-graph. By way of example, the ride sub-graph is a directed acyclic sub-graph (sub-DAG) that describes all possible (feasible) connections between rides in a VRP sub-problem for a cluster via parallel processes 415a-415k, k is the number of clusters. In other words, all rides in the subset belongs to one cluster, and all rides that belong to the cluster must appear in the same subset. In one embodiment, such ride sub-graph is constructed per cluster, by re-constructing the ride sub-graph from the respective ride data (using process 407). In another embodiment, such ride sub-graph is constructed per cluster, by extracting only the relevant nodes and edges in the ride graph generated in process 407 associated with the ride subset.

Then after, the routing module 201 use VRP solvers to process in parallel the enhanced ride data, the shared ride data, and/or the ride sub-graph corresponding to subsets of rides in clusters to provide optimal clusters/plans via parallel processes 417a-417k. In one embodiment, the VRP solvers is designed for solving a mixed integer programing (MIP) problem, e.g., Gurobi Optimizers, OR-tools, etc., that can state the VRP as a mathematical model and automatically solve the VRP. MIP is a special case of linear programming (LP) where at least one of the variables can only take on integer values. LP is a method to maximize or minimize a linear objective function subject to one or more constraints/requirements that are represented by a linear relationship. An optimization procedure requires solving a MIP problem which, like linear programing, is a sub-field of combinatorial optimization.

Subsequently, the routing module 201 merges the clusters/plans into one complete set of plans in process 419. As the simplest implementation, the routing module 201 stacks the clusters/plans one after the other. In another implementation, the routing module 201 finds two or more plans (each from a different cluster) for a driver/vehicle to execute plans one after the other. In other embodiments, the routing module 201 implements more complicated post-processing implementations for one or more driver/vehicle to execute in process 421.

Figure 5:
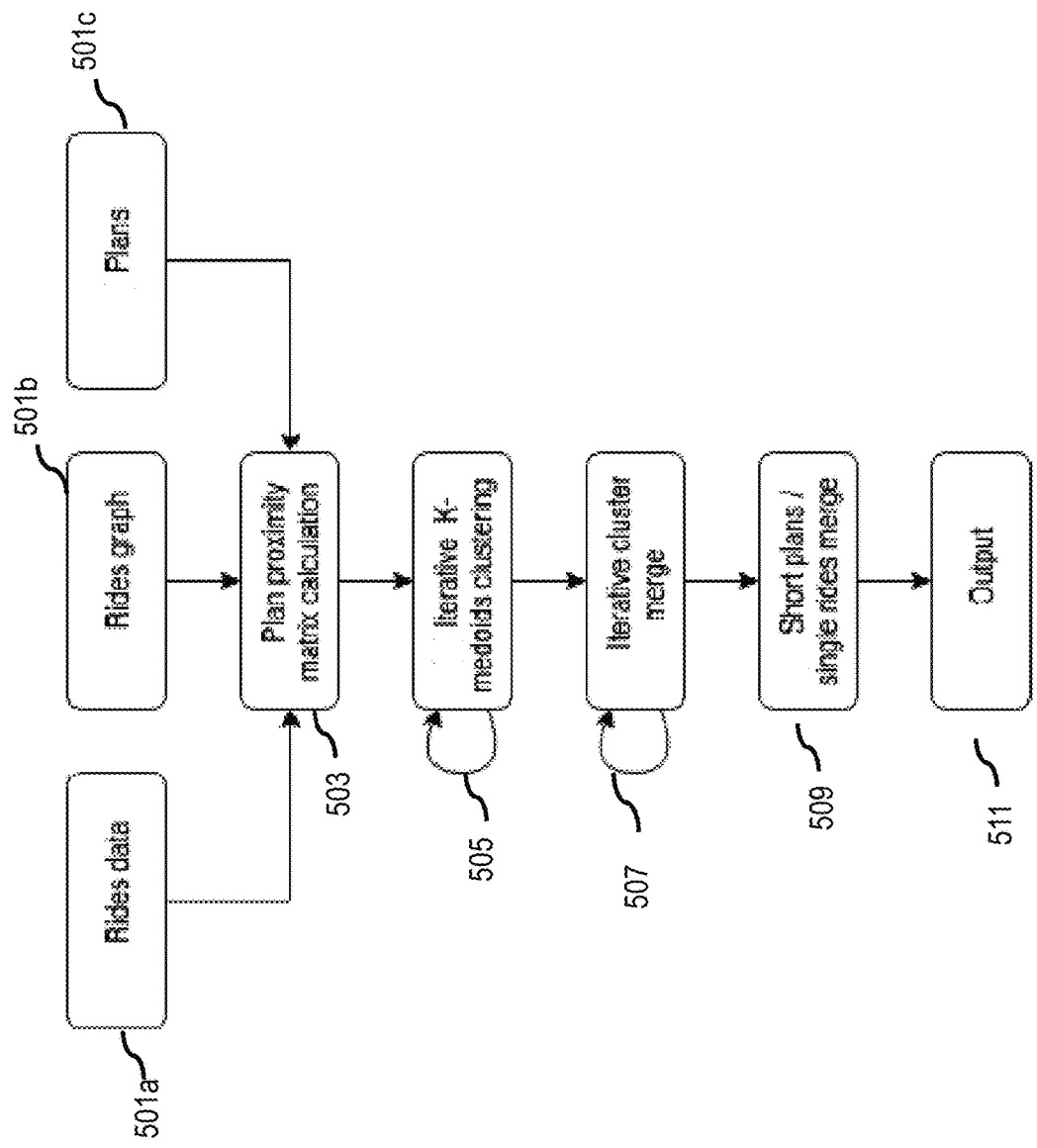
FIG. 5 is a flowchart of a process for clustering plans of a large scale vehicle routing problem, according to one embodiment.

Referring back to clustering, FIG. 5 is a flowchart of a process for clustering plans of a large scale vehicle routing problem, according to one embodiment. The clustering process 500 aim to cluster rides, and the rides are represented in the form of ride sets for a driver/vehicle to traverse ("plans").

As mentioned, the clustering module 205 processes the enhanced ride data (including the shared ride data) 501a, the ride graph 501b, the sub-optimal plans 501c, etc., using an iterative clustering algorithm to assigns each ride to a cluster, thereby splitting one large VRP into several small VRPs. In one embodiment, the ride graph is represented as a matrix, and an adjacency matrix A (shape N×N, N is the total number of rides) has values each of which corresponds to an edge between two nodes (rides) in the rides graph. For example, the proximity measuring module 203 constructs a first matrix $P_i$ representing the nodes of the ride graph of the first plan (plan), and constructs a second matrix $P_j$ representing the nodes of the ride graph of the second plan (plan).

A plan is represented as a matrix $P_i$ (with a shape N×N, where N is the total number of rides), and A (adjacency matrix of plan$_j$) has the same shape. $P_i$ contains values from A (adjacency matrix) in all columns and rows corresponding to rides that are a part of the plan, all other values in $P_i$ are set to zeros. In other words, $P_i$ is a sub-graph, extracted from the ride graph, that contains all nodes (rides) that are included in plan$_i$, all edges going in and out of these nodes, and all out-of-plan nodes that have at least one edge in common with the plan nodes. In one embodiment, some sub-graphs overlap with each other.

The proximity measuring module 203 can calculate a distance.

The proximity is calculated in process 503 based on a distance metric D=($d_{ij}$=dist($p_i$, $p_j$)) as shown in Table 2 between the first matrix and the second matrix (i.e., two plans) using known methods (e.g., cosine distance between matrices, etc.), or a "plan projection" method discussed below.

TABLE 2

Matrix D, where the value in row i and column j is a distance/proximity measure between plan$_i$ and plan$_j$ $d_{ij}$ = dist($p_i$, $p_j$)

In one embodiment, the distance metric is based on one or more edge values between the nodes, and the one or more edge values are based on whether the one or more feasible connections are present between the nodes. Any other metric between rides or a combination (linear or otherwise) of these metrics can be used for weighting the edge. By way of example, an edge value is 1/eta between the rides when the rides cannot be shared, and to the 95$^{th}$ percentile of all edges when the rides are shared, so as to artificially create a stronger connection between rides that can be shared.

In another embodiment, the distance metric is based on one or more common nodes between the first matrix $P_i$ and the second matrix $P_j$, and the proximity measuring module 203 calculates one or more proximity variables based on the one or more common nodes listed in Table 3 to measure plan proximity in process 503, i.e., the "plan projection" method. $P_i$ is the matrix form representation of plan$_i$, $P_i^T$ is the transpose of $P_i$, and a set of proximity variables S include at least one of: a first variable based on the one or more edge values corresponding to first edges entering the one or more common nodes, a second variable based on the one or more edge values corresponding to second edges exiting the one or more common nodes, a third variable based on the one or more edge values corresponding to third edges entering the one or more common nodes from the first plan and exiting the one or more common nodes to the second plan, and a fourth variable based on the one or more edge values corresponding to fourth edges entering the one or more common nodes from the second plan and exiting the one or more common nodes to the first plan. The distance metric is based on the one or more variables. In addition, the proximity measuring module 203 applies a Normalization_factor to normalize a proximity or a distance of two plans to a normalized proximity Proximity$_{norm}$ or a normalized distance Distance$_{norm}$ to a value between 0 and 1. The Normalization_factor accounts for the total amount of interactions (edges) that each plan has, regardless of the interaction between plan$_i$ and plan$_j$.

TABLE 3

A common node is a node common to both plans ($P_i$ and $P_j$) sub-graphs, then variables are interoperated as follows:
$S_{ij}^T$ is the sum of multiplications of all edges entering common nodes (and $S_{ij}^T = S_{ji}^T$)

$$S_{ijT} = \sum_{j=0}^{N} \sum_{i=0}^{N} P_i * P_j^T$$

TABLE 3-continued $S_{i}^{T}{}_{j}$ is the sum of multiplications of all edges exiting common nodes (and $S_{i}^{T}{}_{j} = S_{j}^{T}{}_{i}$)

$$S_{i}T_{j} = \sum_{j=0}^{N}\sum_{i=0}^{N} P_{i}^{T} * P_{j}$$

$S_{ij}$ is the sum of multiplications of all edges entering common nodes from $plan_i$ with all edges exiting common nodes to $plan_j$.

$$S_{ij} = \sum_{j=0}^{N}\sum_{i=0}^{N} P_{i} * P_{j}$$

$S_{ji}$ is the sum of multiplications of all edges entering common nodes from $plan_j$ with all edges exiting common nodes to $plan_i$.

$$S_{ji} = \sum_{j=0}^{N}\sum_{i=0}^{N} P_{j} * P_{i}$$

$S_{total}$ is the sum of all proximity calculation.
$$S_{total} = S_{ij}^{T} + S_{i}T_{j} + S_{ij} + S_{ji}$$
Normalization_factor accounts for the total amount of interactions (edges) that each plan has, regardless of the interaction between $plan_i$ and $plan_j$.

$$normalization_{factor} = \sum_{j=0}^{N}\sum_{i=0}^{N}(P_{i}*P_{i} + P_{j}*P_{j}) + 0.5 * \sum_{j=0}^{N}\sum_{i=0}^{N}(P_{i}*P_{i}^{T} + P_{i}^{T}*P_{i} + P_{j}*P_{j}^{T} + P_{j}^{T}*P_{j})$$

$Proximity_{norm}$ is a normalized proximity and $Distance_{norm}$ is a normalized distance.

$$Proximity_{norm} = \frac{S_{total}}{normalization_{factor}}$$

$$Distance_{norm} = 1 - Proximity_{norm}$$

Subsequently, the clustering module 205 iteratively splits the one or more clusters until a corresponding cluster size is below a maximum cluster size threshold. By way of example, the clustering module 205 uses the distance matrix to determine the best split of the entire set of plans into two clusters using a known clustering algorithm (e.g., K-medoids clustering algorithm). After the initial split, the clustering module 205 iteratively splits the largest cluster into two clusters until all clusters are smaller than a maximum allowed number of rides (e.g., 200 rides) in process 505, and then assigns a cluster ID for each plan. Since the K-medoids algorithm can be highly affected by outliers, the clustering module 205 sets aside very short plans (e.g., less the 2-3 rides which tend to by outliers in the feature space) from the clustering process.

The clustering module 205 then iteratively merges the one or more clusters until a corresponding cluster size is above a minimum cluster size threshold. By way of example, the clustering module 205 merges one or more of the clusters based a closest cluster determined using the proximity measure. In order to avoid very small clusters that appear after process 505, the clustering module 205 merges the smallest cluster with one of the other clusters based on a distance matrix and a proximity measure similarly calculated as the distance matrix and the proximity measure in process 503, where matrix P represent a cluster (instead of representing only one plan in process 503) and includes all rides belonging to this cluster. The clustering module 205 continues to merge the smallest cluster iteratively until all clusters are larger than a minimum allowed number of rides (e.g., 100 rides) or until the clustering module 205 cannot merge without exceeding the maximum allowed number of rides (e.g., 200 rides) in process 507.

Then after, in process 509, the clustering module 205 adds the very short plans (e.g., less the 2-3 rides set aside from the clustering) back to the closest cluster using distance metric calculated in process 503. In process 511, the output module 207 outputs the refined clusters to the routing module 201 for parallel processing as shown in FIG. 4.

Figure 6A:
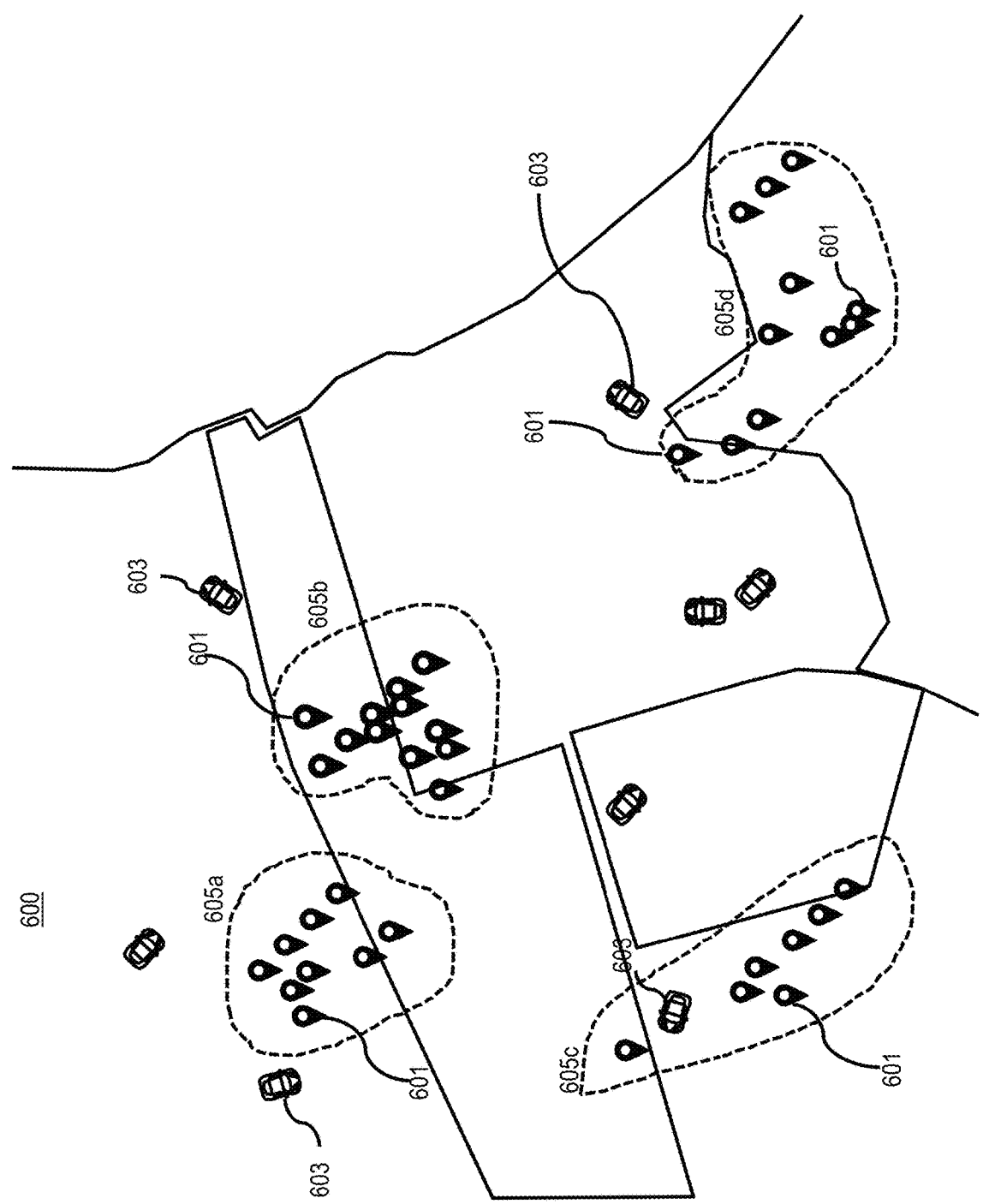
FIG. 6A illustrates a schematic representation of a user interface associated with a routing platform providing large scale vehicle routing, according to one embodiment.

FIG. 6 illustrates a schematic representation 600 of a user interface on the routing platform 111 or a user equipment (such as the user device 103) communicating with the routing platform 111, in accordance with an example embodiment. In one embodiment, the clusters/plans can be presented to a user via a navigation system or application user interface (e.g., a voice-based, visual, audio, etc. user interface) to begin providing large scale vehicle routing.

By way of example, the user interface shows a graphical representation of a plurality of pick-up and drop-off locations 601 and vehicle location 603 designated by one or more services, such as taxi services, package delivery services, etc. that utilize ride data of fleet optimization and demand prediction. In one example, the ride data may be processed by the system 100, the routing platform 111, or any similar systems configured with a processor, in association with the routing platform 111, to cluster the rides into clusters/plans 605a-605d. Further, the cluster/plan data may be streamed from the system 100 or the routing platform 111 through the network 115.

In one embodiment, the system 100 or the routing platform 111 may be configured to dynastically, in real-time, or substantially in real-time, adjust large scare vehicle routing based on demand and supply changes in the vehicles, customers, packages, etc. In one embodiment, the system 100 or the routing platform 111 may be configured to dynastically, in real-time, or substantially in real-time, adjust large scare vehicle routing based on contextual changes in operational costs, weather, traffic (e.g., accidents, road hazards, road closures, construction events, special or public events), etc.

FIG. 6B is a diagram of a user interface used in the processes for providing large scale vehicle routing, according to one embodiment. More specifically, FIG. 6B illustrates a user interface displaying a vehicle routing and scheduling table 620 that can be used in real-time by participants (e.g., a fleet management personnel, a ride-sharing service personnel, a package delivery service personnel, a merchant, a customer, a driver, a passenger, etc. with different levels of data access based on credentials) in a large scale vehicle routing provided by the system 100. In one embodiment, Table 620 contains a daily table of one entity, e.g., a ride-sharing service, a package delivery service, etc. In another embodiment, Table 620 contains a daily table of a plurality of entities which are customers of the system 100, so that a system administrator can have an overall view of all rides of its customers. In yet another embodiment, Table 620 contains a daily table of one entity that operates different services, including a ride-sharing service, a package delivery service, etc.

By way of example, Plan 1 is assigned to Vehicle ID 123 to execute a plurality of ride throughout the day, including Ride 001 (with a cost estimate of $75) from a pick-up node ID 599085 (e.g., the depot 105 in FIG. 1) at 6:30 am to pick up 96 packages to travel to a drop-off node ID 928046 at 6:50 am to drop of 5 of the 96 packages and pick-up 3 new packages, Ride 002 (with a cost estimate of $100) from the node ID 928046 at 6:55 am to travel to a drop-off node ID 818580 at 7:30 am to drop of 2 packages without picking up any package, Ride 003 (with a cost estimate of $60) from the node ID 818580 at 7:35 am to travel to a drop-off node ID 306046 at 8:00 am to drop of 4 packages . . . .

As another example, Plan 2 is assigned to Vehicle ID 71 to execute a plurality of ride throughout the day, including Ride 062 (with a cost estimate of $25) from a pick-up node ID 098899 at 8:00 am to pick up a passenger who needs wheelchair access to travel to a drop-off node ID 018358 at 8:10, Ride 063 (with a cost estimate of $15) from the node ID 018358 at 8:15 am to travel to a drop-off node ID 070000 at 8:35 am to drop off the first passenger and pick up 2 passengers, Ride 064 (with a cost estimate of $15) from the node ID 070000 at 9:10 am to travel to a drop-off node ID 091754 at 10:10 am to drop of one of the two passengers and pick up a new passenger . . . .

As another example, Plan 3 is assigned to Vehicle ID 251 to execute a plurality of ride throughout the day, including Ride 103 (with a cost estimate of $100) from a pick-up node ID 599085 (e.g., an airport) at 2:00 pm to pick up 9 passengers who needs wheelchair access to travel to a drop-off node ID 660032 at 2:30 to drop 2 passengers at the first hotel, . . . .

The system 100 can match pick-up node IDs, drop-off node IDs, etc. to physical addresses, GPS coordinates, etc. in the routing data database 121 and/or the geographic database 123. In one embodiment, the system 100 set the pick-up/drop-off times/locations consecutive and nonoverlapping to allow the vehicles efficiently move from one ride to the next ride with a minimum cost that considers distance, time, fuel cost, vehicle wear and tear, etc.

The system 101 provides large scale vehicle routing for a plurality of routes for a delivery fleet to efficiently serve a lot of customer nodes. The system 100 also supports the system administrator, the customer, the driver, the passenger, etc. to (1) edit the ride data values, such as pick-up and/or drop-off nodes, etc. via the user interface, (2) analyzes the ride data in various ways, and (3) display the routes/plans in a map for the vehicle 101, the user device 103, etc., with various access right levels, depending on service agreements among the system 100 and different entities.

The about-described embodiments solve large scale vehicle routing problems using ride clustering to calculate an optimal plan for N drivers/vehicles to carry all passengers/packages/customers to respective destinations using various optimization criteria, and they are applicable to different vehicle rides routing, such as pre-booked taxi rides, vehicle based delivery rides, shuttle rides, etc.).

Returning to FIG. 1, as described above, the system 100 includes a routing platform 111 to perform the functions associated with providing large scale vehicle routing according to the embodiments described herein. The system 100 also includes one or more vehicles 101 and/or user devices 103 with connectivity to the routing platform 111 over a communication network 115. In one embodiment, the vehicles 101 and/or user devices 103 are or may include navigation systems or other devices (e.g., mobile devices) capable of executing applications 113 configured to provide large scale vehicle routing as described according to the various embodiments discussed herein. In one embodiment, the vehicles 101 and/or user devices 103 can act independently or as clients of the routing platform 111 to provide large scale vehicle routing. In addition, the vehicles 101, user devices 103, and/or applications 113 can perform all or a portion of the functions of the routing platform 111.

In one embodiment, the vehicles 101 and/or user devices 103 may include or have access to respective sensors 125a and 125b (also collectively referred to as sensors 125). By way of example, the sensors 125 may include various sensors for determining location and/or geospatial information to support the functions of the routing platform 111 and/or any other navigation system such as routing and mapping. The vehicles 101 and/or user devices 103 may utilize sensors 125 such as GPS or other satellite-based location receivers for determining geospatial or location information. The sensors 125 may also be used to perform cellular triangulation, assisted-GPS, or other location-based techniques for determining the geographic coordinates of a user device 103. In addition, the sensors 125 may be used to gather temporal, spatial or environmental information regarding the user devices 103 and/or the roadways/intersections on which the user devices 103 are traveling. By way of example, the sensors may detect speed and location data, tilt data (e.g., a degree of incline or decline of the vehicle along a path of travel), motion data, light data, sound data, image data, weather data and the like.

Still further, the sensors 125 may detect local or transient network and/or wireless signals, such as those transmitted by nearby devices during navigation of a vehicle associated with the user. This may include, for example, network routers as configured within a premise (e.g., home or business), vehicles 101, or other user devices 103 encountered during navigation. Other signals detected may include those transmitted by traffic related objects such as traffic lights, traffic cameras, signals, digital signage or the like. It is noted that, in certain implementations, the sensors 125 of a vehicle 101 in which a user device 103 is present may be configured to interact with the sensors 125 of the user device 103 for enabling data exchange (e.g., geospatial information exchange) and interaction. This exchange may be facilitated by way of any known or still developing range based or wireless communication protocols.

As noted above, in one embodiment, the routing platform 111 performs the functions associated with providing large scale vehicle routing according to the embodiments described herein. In one embodiment, the system 100 includes an infrastructure for sharing geospatial information in real-time on multiple devices that includes a map-based service, application, and/or web interface that provides a typical map user interface. By way of example, a map-based service 119a, application, and/or interface can be provided over the communication network 115 by the services platform 117.

In one embodiment, the routing platform 111 may be configured to interface directly with the services platform 117 that provides various services. For example, in addition to the map service 119a (e.g., for providing mapping data and related information), the services platform 117 may include a routing service 119b (e.g., to provide a routing engine for calculating navigation routes), a traffic service 119c (e.g., to provide traffic updates and conditions along a route), a weather service 119d (e.g., to provide weather conditions along a route), a user service 119e (e.g., to enable a user to manage account information, configure personalized preferences, and engage in social interactions with other users), and/or other services 119m (also collectively referred to as services 119). In addition, the routing platform 111 and/or the services platform 117 may interface with one or more content providers 127a-127k (also collectively referred to as content providers 127) that provide/deliver content of various types and genres (e.g., geospatial information, mapping content, navigation content, travel content, locality content, marketing content) upon request. Requests may be initiated via the communication network 115 by way of one or more location-based applications 113 executing on the vehicles 101 and/or user devices 103 that are associated with respective users. By way of example, the applications 113 may access turn-by-turn navigation, routing information, maps, driving instructions, etc., for accessing, annotating, and/or sharing geospatial information. In one embodiment, the routing platform 111 can store and/or retrieve historical routing data and/or current or real-time routing data in the routing data database 121, and store geospatial information, annotations, and/or other related information in the geographic database 123 (further described below with respect to FIG. 6). In one embodiment, the services platform 117 and/or any of the services 119 may also have connectivity to the geographic database 123.

In one embodiment, the system 100 includes software to enhance the applications 113, the services 119, the services platform 117, the content providers 127, and/or any other component of the system 100 to enable a user to utilize navigational guidance information based on routes calculated to provide argumentative routing. In one embodiment, the system 100 can be used to augment (e.g., by automatically communicating to a user) navigational guidance with weather reports, traffic information, and other like information that may be of relevance to a user to providing large scale vehicle routing. In one embodiment, the geospatial information and/or related route are saved on the participating users' user devices 103 or other equivalent data such as the routing data database 121.

By way of example, navigational information includes, but is not limited to, information related to routes, public spaces (parks, libraries, etc.), geographic areas (towns, boroughs, city blocks, etc.), points-of-interest (restaurants, shopping, etc.), and other like navigational information. Such information may be gathered as navigational information or to supplement preexisting information, and may further include crowd source data, network information, public databases, public information (public transport schedules, etc.), and other like information. In one embodiment, navigational information also may include a number of forms including annotations related to route information, location, logos, visual images, acronyms, and other like forms that may indicate navigational information.

By way of example, the user device 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, embedded navigation system, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the user device 103 can support any type of interface to the user (such as "wearable" circuitry, etc.). In one embodiment, the user device 103 can be a vehicle or a component part of a vehicle.

By way of example, the applications 113 may be any type of application that is executable at the user device 103, such as communication services (e.g., texting applications, calling applications, etc.), location-based service applications, navigation applications, camera/imaging application, media player applications, social networking applications, calendar applications, and the like. In one embodiment, one of the applications 113 at the user device 103 may act as a client for the routing platform 111 and perform one or more functions of the routing platform 111. In one scenario, users are able to select a destination via one or more map applications. In one embodiment, one or more receivers of the user device 103 may process and present routes and related justification messages to provide argumentative routing.

The communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the components of the system 100 communicate with each other and other components using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
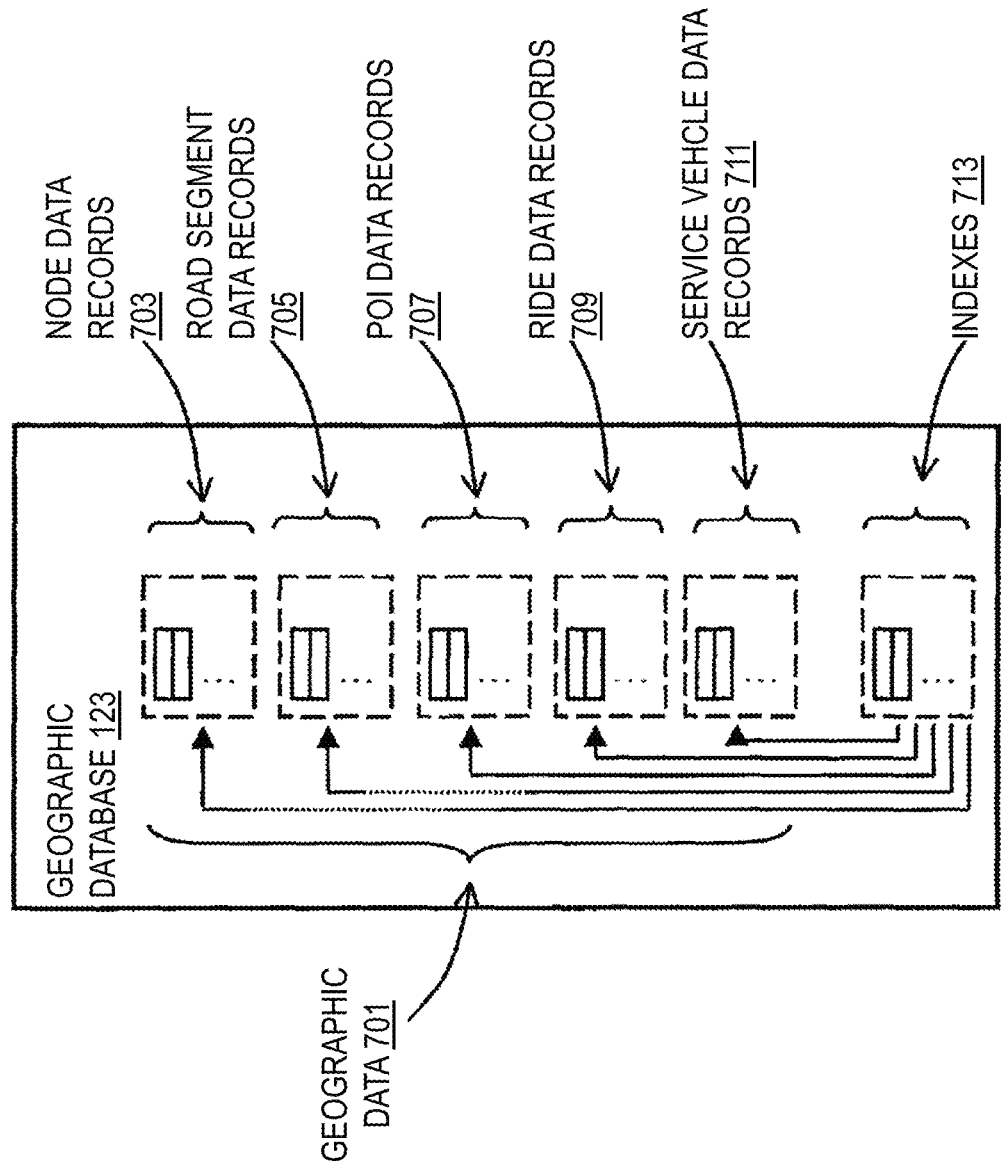
FIG. 7 is a diagram of the geographic database, according to one embodiment.

FIG. 7 is a diagram of a geographic database 123, according to one embodiment. In one embodiment, geographic database 123 includes geographic data 701 used for (or configured to be compiled to be used for) large scale vehicle routing, such as for step counting to access a POI pickup point, video odometry based on mapped features, e.g., lane lines, road markings, signs, etc.

In one embodiment, geographic features, e.g., two-dimensional or three-dimensional features, are represented using polygons, e.g., two-dimensional features, or polygon extrusions, e.g., three-dimensional features. For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in geographic database 123.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes, e.g., used to alter a shape of the link without defining new nodes.

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary, e.g., a hole or island. In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In geographic database 123, overlapping geographic features are represented by overlapping polygons. When polygons overlap, the boundary of one polygon crosses the boundary of the other polygon. In geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 703, road segment or link data records 705, POI data records 707, ride data records 709, service vehicle data records 711, and indexes 713, for example. More, fewer or different data records can be provided. In one embodiment, additional data records (not shown) can include cartographic ("carto") data records, routing data, and maneuver data. In one instance, the additional data records (not shown) can include user mobility pattern data. In one embodiment, the indexes 713 may improve the speed of data retrieval operations in geographic database 123. In one embodiment, the indexes 713 may be used to quickly locate data without having to search every row in geographic database 123 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes, an estimated time of arrival, or a combination thereof (e.g., an estimated time of arrival of a vehicle 101 at a POI pickup point). The node data records 703 are end points corresponding to the respective links or segments of the road segment data records 705. The road link data records 705 and the node data records 703 represent a road network, such as used by vehicles, cars, and/or other entities. Alternatively, the geographic database 123 can contain path segment and node data records or other data that represent pedestrian paths, bicycle paths, or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 707. In one instance, the POI data records 707 can include indoor map information, entry-exit point information (e.g., numbers and locations of entry-exit points), historic pedestrian traffic flows within the POI, historic vehicular traffic flows proximate to the POI, opening and closing times of a POI, etc.

In one embodiment, the indoor map information is created from high-resolution 3D mesh or point-cloud data generated, for instance, from LiDAR. The 3D mesh or point-cloud data are processed to create 3D representations of interior pathways, hallways, corridors, etc. of a POI at centimeter-level accuracy for storage in the POI data records 707.

In one embodiment, the geographic database 123 can also include ride data records 709. By way of example, the ride data records 709 may include pick-up and drop-off location data, requested drop-off time data, data of a number of passengers/packages, special requests (e.g., wheelchair compatible, etc.), passenger/package details, etc. In another embodiment, the ride data records 709 may include route data from a pick-up point to a destination, a pick-up time, a distance from a pick-up point to a drop-off point, an estimated time for a ride, etc.

In one embodiment, the geographic database 123 can also include service vehicle data records 711. In another embodiment, the service vehicle data records 711 stores information relating to the one or more ride hailing/sharing services, one or more package delivery services, one or more service vehicles, e.g., vehicle type, vehicle features, operational cost information, etc. By way of example, the service vehicle data records 711 can be associated with one or more of the node data records 703, road segment data records 705, and/or POI data records 707 to support large scale vehicle routing.

In one embodiment, geographic database 123 can be maintained by a content provider 127 in association with the services platform 117, e.g., a map developer. The map developer can collect geographic data to generate and enhance geographic database 123. There can be different ways used by the map developer to collect data. These ways can include obtaining data from other sources, such as municipalities or respective geographic authorities. In addition, the map developer can employ field personnel to travel by foot with a UE 101 within various large POIs to determine step counting information or records about them, for example. Also, remote sensing, such as aerial or satellite photography, can be used for approximating interior distances (e.g., using one or more satellites 123).

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, a UE 101, for example. The navigation-related functions can correspond to pedestrian navigation, vehicle navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing a ride-hailing/ride-booking service based on user disability data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
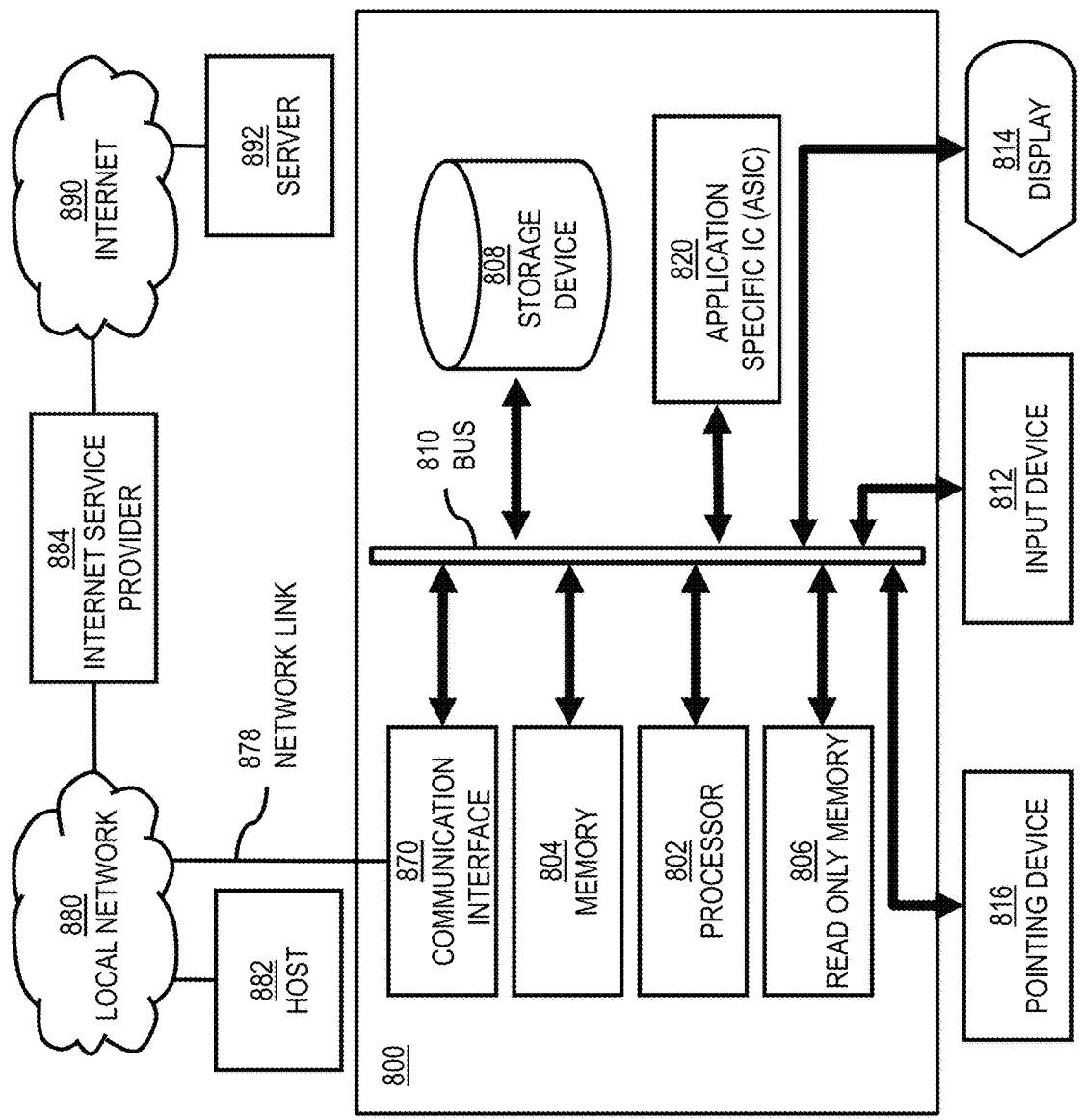
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to provide large scale vehicle routing as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to provide large scale vehicle routing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing large scale vehicle routing. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing large scale vehicle routing, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 115 for providing large scale vehicle routing to the vehicle 101.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to provide large scale vehicle routing as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide large scale vehicle routing. The memory 905 also stores the data associated with or generated by the execution of the inventive steps.

Figure 10:
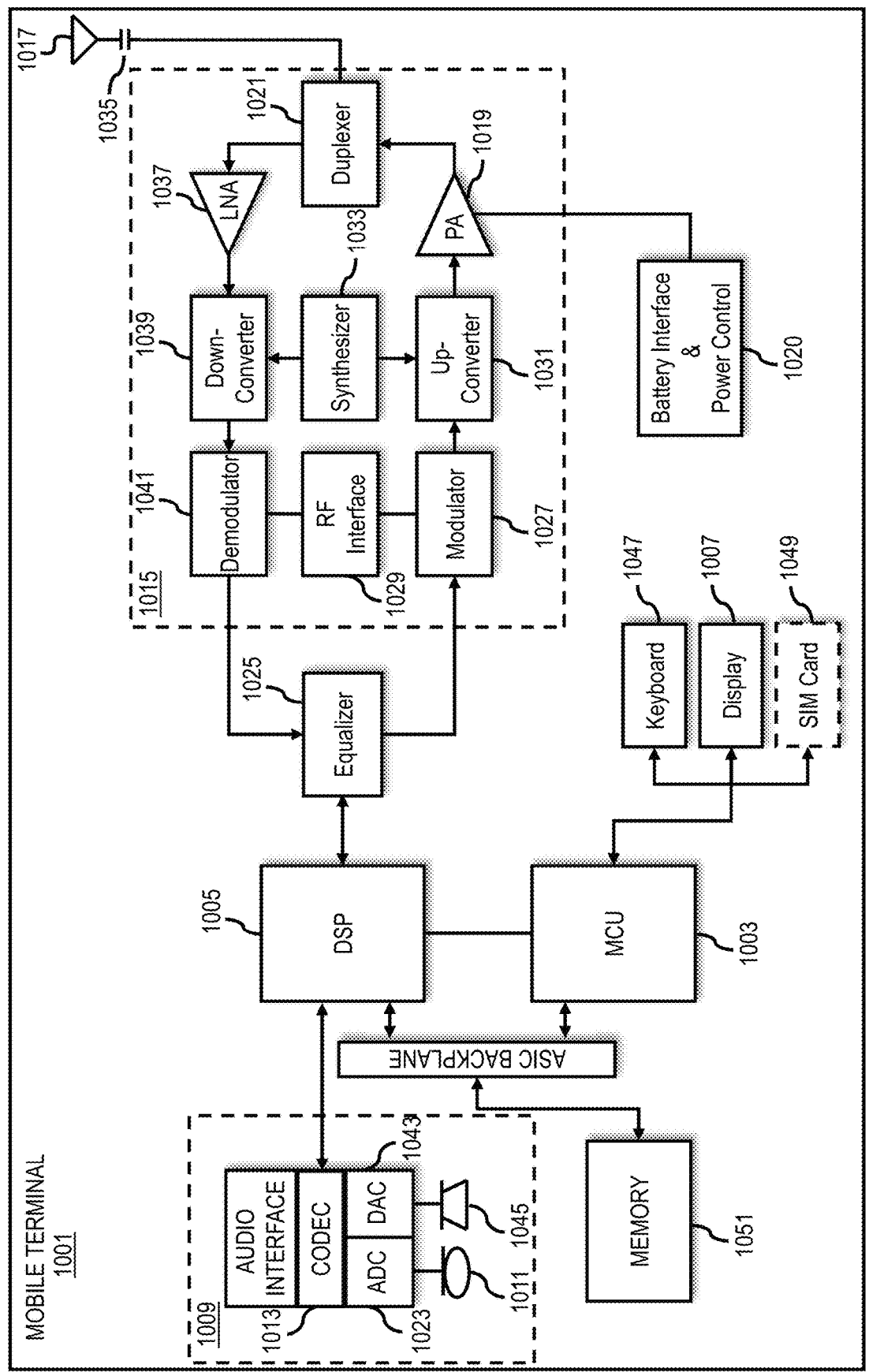
FIG. 10 is a diagram of a user device that can be used to implement an embodiment.

FIG. 10 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide large scale vehicle routing. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for large scale vehicle routing comprising:
  receiving a plurality of plans, wherein a plan of the plurality of plans assigns a vehicle, a driver of the vehicle, or a combination thereof a set of rides to traverse;
  constructing a ride graph to represent feasible connections between the set of rides in a first plan of the plurality of plans, a second plan of the plurality of plans, or a combination thereof, wherein the feasible connections are connections in which the vehicle following the first plan, the second plan, or a combination can arrive from a drop-off location of a first ride to a pick-up location of a second ride without being late to a pick-up time of the second ride;
  clustering the plurality of plans into one or more clusters based on a proximity measure, wherein the proximity measure indicates a proximity of the first plan to the second plan based the ride graph;
  for each cluster of the one or more clusters, separately computing a solution to a large scale vehicle routing problem for the set of rides in said each cluster, wherein the large scale vehicle routing problem is a non-deterministic polynomial-time hard problem; and
  causing the vehicle, the driver, or a combination thereof to traverse the set of rides based on the solution.

2. The method of claim 1, wherein the proximity of the first plan to the second plan is based on a probability that a first driver following the first plan can take on a ride from the second plan.

3. The method of claim 1, further comprising:
  dropping one or more of the feasible connections from the ride graph, wherein the one or more feasible connections have a travel time, a distance, a wait time, or a combination thereof between rides exceeding a threshold, wherein the proximity measure is based the ride graph without the one or more feasible connections.

4. The method of claim 1, wherein each node of the ride graph corresponds to a ride of the set of rides, the method further comprising:
  constructing a first matrix representing the nodes of the ride graph of the first plan; and
  constructing a second matrix representing the nodes of the ride graph of the second plan,
  wherein the proximity measure is based on a distance metric calculated between the first matrix and the second matrix.

5. The method of claim 4, wherein the distance metric is based on one or more common nodes between the first matrix and the second matrix.

6. The method of claim 5, wherein the distance metric is based on one or more edge values between the nodes, and wherein the one or more edge values are based on whether the feasible connections are present between the nodes.

7. The method of claim 6, further comprising:
  calculating one or more variables based on the one or more common nodes,
  wherein the one or more variables include at least one of:
    a first variable based on the one or more edge values corresponding to first edges entering the one or more common nodes;
    a second variable based on the one or more edge values corresponding to second edges exiting the one or more common nodes;
    a third variable based on the one or more edge values corresponding to third edges entering the one or more common nodes from the first plan and exiting the one or more common nodes to the second plan; and
    a fourth variable based on the one or more edge values corresponding to fourth edges entering the one or more common nodes from the second plan and exiting the one or more common nodes to the first plan, and wherein the distance metric is based on the one or more variables.

8. The method of claim 1, further comprising:

iteratively split the one or more clusters until a corresponding cluster size is below a maximum cluster size threshold, and wherein the set of rides include at least 100 rides that comprise one or more shared rides.

9. The method of claim 1, further comprising:

iteratively merging the one or more clusters until a corresponding cluster size is above a minimum cluster size threshold.

10. The method of claim 9, wherein the one or more clusters are merged based a closest cluster determined using the proximity measure.

11. An apparatus for providing large scale vehicle routing, comprising:

a processor; and a memory including computer program code for a program, the memory and the computer program code configured to, with the processor, cause the apparatus to perform at least the following, receive a plurality of plans, wherein a plan of the plurality of plans assigns a vehicle, a driver of the vehicle, or a combination thereof a set of rides to traverse;

construct a ride graph to represent feasible connections between the set of rides in a first plan of the plurality of plans, a second plan of the plurality of plans, or a combination thereof, wherein the feasible connections are connections in which the vehicle following the first plan, the second plan, or a combination can arrive from a drop-off location of a first ride to a pick-up location of a second ride without being late to a pick-up time of the second ride;

cluster the plurality of plans into one or more clusters based on a proximity measure, wherein the proximity measure indicates a proximity of the first plan to the second plan based the ride graph;

for each cluster of the one or more clusters, separately compute a solution to a large scale vehicle routing problem for the set of rides in said each cluster, wherein the large scale vehicle routing problem is a non-deterministic polynomial-time hard problem; and cause the vehicle, the driver, or a combination thereof to traverse the set of rides based on the solution.

12. The apparatus of claim 11, wherein the proximity of the first plan to the second plan is based on a probability that a first driver following the first plan can take on a ride from the second plan.

13. The apparatus of claim 11, wherein each node of the ride graph corresponds to a ride of the set of rides, and the apparatus is further caused to:

construct a first matrix representing the nodes of the ride graph of the first plan; and construct a second matrix representing the nodes of the ride graph of the second plan, wherein the proximity measure is based on a distance metric calculated between the first matrix and the second matrix.

14. The apparatus of claim 13, wherein the distance metric is based on one or more common nodes between the first matrix and the second matrix.

15. A non-transitory computer-readable storage medium for providing large scale vehicle routing, carrying one or more sequences of one or more instructions which, when executed by one or more processors, cause an apparatus to at least perform the following steps:

receiving a plurality of plans, wherein a plan of the plurality of plans assigns a vehicle, a driver of the vehicle, or a combination thereof a set of rides to traverse;

constructing a ride graph to represent feasible connections between the set of rides in a first plan of the plurality of plans, a second plan of the plurality of plans, or a combination thereof, wherein the feasible connections are connections in which the vehicle following the first plan, the second plan, or a combination can arrive from a drop-off location of a first ride to a pick-up location of a second ride without being late to a pick-up time of the second ride;

clustering the plurality of plans into one or more clusters based on a proximity measure, wherein the proximity measure indicates a proximity of the first plan to the second plan based the ride graph;

for each cluster of the one or more clusters, separately computing a solution to a large scale vehicle routing problem for the set of rides in said each cluster, wherein the large scale vehicle routing problem is a non-deterministic polynomial-time hard problem; and causing the vehicle, the driver, or a combination thereof to traverse the set of rides based on the solution.

16. The non-transitory computer-readable storage medium of claim 15, wherein the proximity of the first plan to the second plan is based on a probability that a first driver following the first plan can take on a ride from the second plan.

17. The non-transitory computer-readable storage medium of claim 15, wherein each node of the ride graph corresponds to a ride of the set of rides, and the apparatus is caused to further perform:

constructing a first matrix representing the nodes of the ride graph of the first plan; and constructing a second matrix representing the nodes of the ride graph of the second plan, wherein the proximity measure is based on a distance metric calculated between the first matrix and the second matrix.

18. The non-transitory computer-readable storage medium of claim 17, wherein the distance metric is based on one or more common nodes between the first matrix and the second matrix.

19. The non-transitory computer-readable storage medium of claim 18, wherein the distance metric is based on one or more edge values between the nodes, and wherein the one or more edge values are based on whether the feasible connections are present between the nodes.

20. The apparatus of claim 14, wherein the distance metric is based on one or more edge values between the nodes, and wherein the one or more edge values are based on whether the feasible connections are present between the nodes.

* * * * *